United States Patent
Park

(10) Patent No.: US 8,228,433 B2
(45) Date of Patent: Jul. 24, 2012

(54) METHOD OF CONTROLLING RECEIVER FOR PROCESSING BROADCAST SIGNAL DEFINING MULTI-CHANNEL BROADCAST AND BROADCAST RECEIVER USING THE SAME

(75) Inventor: Hee Young Park, Kyongsangbukdo (KR)

(73) Assignee: LG Electronics Inc., Seoul (KR)

( * ) Notice: Subject to any disclaimer, the term of this patent is extended or adjusted under 35 U.S.C. 154(b) by 710 days.

(21) Appl. No.: 12/440,875

(22) PCT Filed: Mar. 23, 2007

(86) PCT No.: PCT/KR2007/001428
§ 371 (c)(1),
(2), (4) Date: Apr. 10, 2009

(87) PCT Pub. No.: WO2008/032913
PCT Pub. Date: Mar. 20, 2008

(65) Prior Publication Data
US 2010/0002139 A1      Jan. 7, 2010

(30) Foreign Application Priority Data
Sep. 11, 2006   (KR) .................. 10-2006-0087286

(51) Int. Cl.
*H04N 5/45* (2006.01)
*H04N 5/445* (2006.01)
*H04N 5/50* (2006.01)
(52) U.S. Cl. ......... 348/565; 348/567; 348/569; 348/564
(58) Field of Classification Search .......... 348/563–565, 348/567, 569, 589, 600, 465, 468; 725/136, 725/137, 131, 100, 139, 151, 39; *H04N 5/445, H04N 5/45, 5/50, 9/74, 9/76*
See application file for complete search history.

(56) References Cited

U.S. PATENT DOCUMENTS

| | | | |
|---|---|---|---|
| 5,877,817 A | 3/1999 | Moon | |
| 7,061,545 B1 | 6/2006 | Kweon et al. | |
| 7,742,106 B2 * | 6/2010 | Ko et al. | ............ 348/569 |
| 2003/0212995 A1 | 11/2003 | Kitamori | |
| 2004/0005142 A1 | 1/2004 | Yoo et al. | |

(Continued)

FOREIGN PATENT DOCUMENTS

CN    1666503 A    9/2005

(Continued)

*Primary Examiner* — Sherrie Hsia
(74) *Attorney, Agent, or Firm* — Birch, Stewart, Kolasch & Birch, LLP

(57) ABSTRACT

A method of controlling a receiver for processing a broadcast signal defining a multi-channel broadcast, and a broadcast receiver using the same, enable the joint management of a plurality of channels, which are effectively bundled together according to relevance of broadcasting Content, such that broadcast programs of associated channels can be simultaneously processed, including processes of viewing, recording, and editing. The method includes steps of receiving a broadcast signal having additional information, the additional information including associated channel Information indicating a channel of associated broadcasting content, the associated channel information enabling the receiver to recognize channels having associated broadcasting content; detecting, based on the associated channel information, at least one channel having the associated broadcasting content according to a selection of a specific channel, the detected at least one associated broadcasting content channel having broadcasting content associated with the selected channel; and processing in tandem a broadcast program of the selected channel and a broadcast program of the detected at least one channel.

21 Claims, 5 Drawing Sheets

U.S. PATENT DOCUMENTS

| | | | |
|---|---|---|---|
| 2004/0237123 A1 | 11/2004 | Park | |
| 2005/0253966 A1 | 11/2005 | Mertens | |
| 2006/0176399 A1 | 8/2006 | Kwak et al. | |
| 2007/0296864 A1* | 12/2007 | Kim | 348/564 |
| 2009/0169175 A1* | 7/2009 | Hong et al. | 348/569 |

FOREIGN PATENT DOCUMENTS

| | | |
|---|---|---|
| CN | 1717020 A | 1/2006 |
| EP | 1001614 A1 | 5/2000 |
| WO | WO-03/005362 A1 | 1/2003 |
| WO | WO 2006/064471 A1 | 6/2006 |

* cited by examiner

METHOD OF CONTROLLING RECEIVER FOR PROCESSING BROADCAST SIGNAL DEFINING MULTI-CHANNEL BROADCAST AND BROADCAST RECEIVER USING THE SAME

TECHNICAL FIELD

The present invention relates to program and system information protocol (PSIP) broadcast receivers, and more particularly, to a method of controlling a receiver for processing a broadcast signal defining a multi-channel broadcast and to a broadcast receiver using the same.

BACKGROUND ART

In a digital broadcasting system, content broadcast on one channel may have an association with content broadcast on one or more other channels. Such an association of broadcast content is typically determined by a broadcaster assigning a plurality of multi-channels for carrying associated broadcasting content. In other words, a "multi-channel" is a channel making up part of a multi-channel broadcast, such that each multi-channel can be considered an associated broadcasting content channel.

There are numerous instances where a broadcaster may choose to broadcast associated content via a multi-channel broadcast. Associated content might include, for example, an interrelated set of companion broadcasts (e.g., a newscast with one or more network affiliate feeds) or a sporting event that includes more than one game or where viewer interest in specialized content (player highlights, reverse angel, isolation camera, etc.) is anticipated.

A broadcast receiver, such as that provided in a contemporary digital television, separately processes each of the multi-channels according to a user selection of a corresponding channel. Therefore, to view or record any one of the multi-channels, the user must have prior knowledge of associated content on another multi-channel, i.e., an associated broadcasting content channel, or must perform a corresponding search of such channels. In any event, a separate manual selection for each known channel must be performed, which represents a significant burden to the user and thus tends to discourage multi-channel viewing.

DISCLOSURE OF INVENTION

Accordingly, the present invention is directed to a method of controlling a receiver for processing a broadcast signal defining a multi-channel broadcast and to a broadcast receiver using the same that substantially obviates one or more problems due to limitations and disadvantages of the related art.

An object of the present invention is to provide a method of controlling a receiver for processing a broadcast signal defining a multi-channel broadcast and to a broadcast receiver using the same, by which a plurality of channels may be effectively bundled together according to relevance of broadcasting content, to enable their joint management.

Another object of the present invention is to provide a method of controlling a receiver for processing a broadcast signal defining a multi-channel broadcast and to a broadcast receiver using the same, by which broadcast programs of associated channels can be simultaneously processed, including processes of viewing, recording, and editing.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a method of controlling a receiver. The method comprises receiving a broadcast signal having additional information, the additional information including associated channel information indicating a channel of associated broadcasting content, the associated channel information enabling the receiver to recognize channels having associated broadcasting content; detecting, based on the associated channel information, at least one channel having the associated broadcasting content according to a selection of a specific channel, the detected at least one associated broadcasting content channel having broadcasting content associated with the selected channel; and processing in tandem a broadcast program of the selected channel and a broadcast program of the detected at least one channel, where the processing is performed by one or both of displaying, on a screen of the receiver, a broadcast program of the selected channel and a broadcast program of the detected at least one channel and storing, in a storage device, a broadcast program of the selected channel and a broadcast program of the detected at least one channel, each broadcast program of the detected at least one channel being stored in association with the broadcast program of the selected channel.

According to another aspect of the present invention, there is provided a receiver comprising a tuner for receiving a broadcast signal having additional information, the additional information including associated channel information indicating a channel of associated broadcasting content, the associated channel information enabling the receiver to recognize channels having associated broadcasting content; a detector for detecting, based on the associated channel information, at least one channel having the associated broadcasting content according to a selection of a specific channel, the detected at least one associated broadcasting content channel having broadcasting content associated with the selected channel; and one or both of a display and a storage device, where the display is capable of simultaneously displaying a broadcast program of the selected channel and a broadcast program of the detected at least one channel and the storage device is capable of simultaneously storing a broadcast program of the selected channel and a broadcast program of the detected at least one channel, each broadcast program of the detected at least one channel being stored in association with the broadcast program of the selected channel.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiment(s) of the invention and together with the description serve to explain the principles of the invention. In the drawings.

BEST MODE FOR CARRYING OUT THE INVENTION

Figure 1:
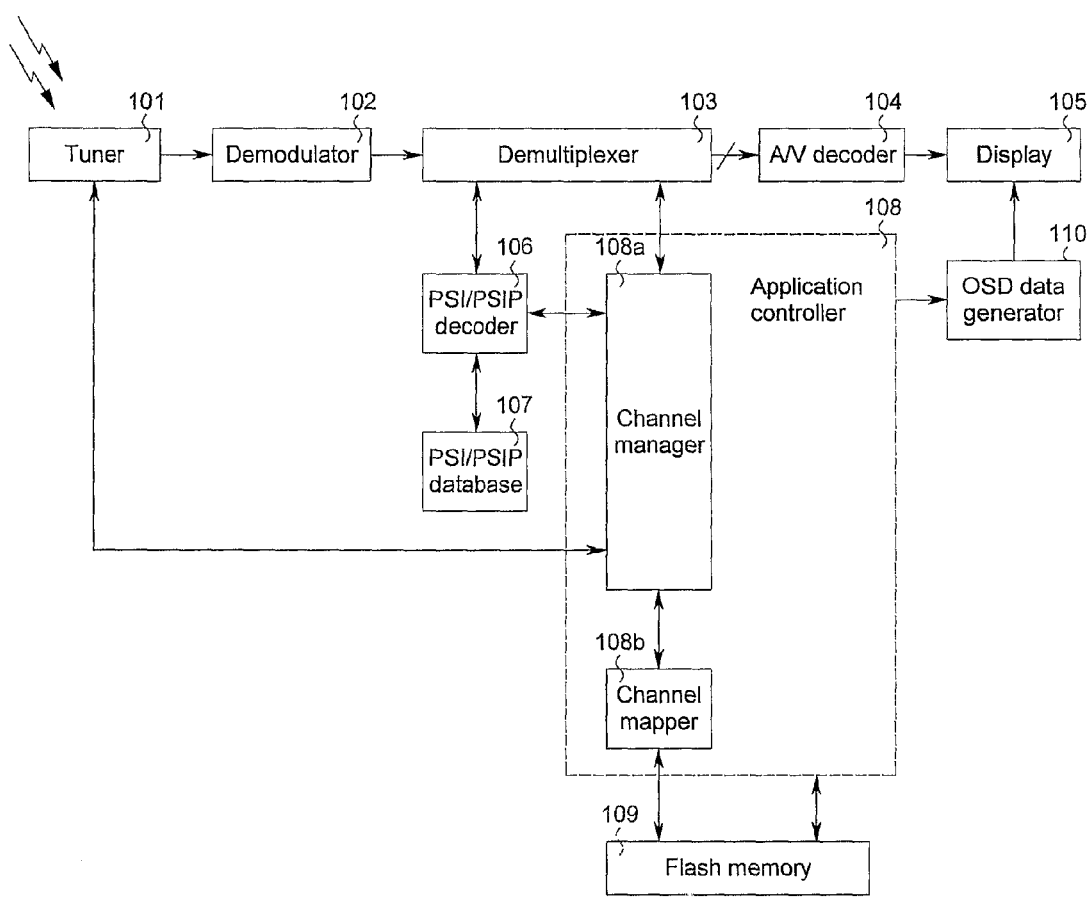
FIG. 1 is a block diagram of a broadcast receiver for processing a broadcast signal defining a multi-channel broadcast according to the present invention.

A digital broadcasting environment requires a communication protocol between transmitting and receiving terminals, and a representative protocol is the program and system information protocol (PSIP). Accordingly, a digital broadcast signal may include PSIP information, which includes a set of tables describing a wide range of parameters corresponding to the broadcast signal and its programming content. Such tables may include a system time table (STT) for delivering time information, a master guide table (MGT) for managing a transmission table, a virtual channel table (VCT) for providing virtual channel information, and a rating region table (RRT) for defining rating references applicable to a country or region.

According to the present invention, PSIP information is included in a broadcast signal to identify each of a plurality of multi-channels carrying associated broadcasting content. The PSIP information constitutes additional information that is included in a transmitted broadcast signal. This additional information may in the alternative be service information for digital video broadcasting (DVB-SI).

In other words, the PSIP information (or service information) maps a specific channel of a currently broadcasted program to at least one multi-channel for broadcasting a program of associated broadcasting content. The multi-channel(s) of the mapping may include one or more channels currently carrying associated broadcasting content, i.e., concurrent with the broadcast of the specific channel, and may include one or more channels that are scheduled to broadcast such content at some later time.

The associated broadcasting content may be defined by a digital broadcasting station, that is, on the side transmitting the PSIP broadcast signal to a receiver, and the mapping information may be defined by a relevant program field included in one or more of a terrestrial virtual channel table (TVCT), a cable virtual channel table (CVCT), and an event information table (EIT). To map events having associated broadcasting content, text information of the same pattern may be defined by a title text field in the EIT or by an extended text message field in an extended text table (ETT). Specifically, the mapping information may be defined by a relevant program descriptor in an EIT.

For example, a channel having associated broadcasting content can indicate a standard channel for transmitting a program (e.g., a soccer game) normally, while one or both of first and second subchannels may carry programming (e.g., a feed from an isolation camera focusing on a specific player or players). Thus, the first and second subchannels are associated broadcasting content channels enabling a multi-channel broadcast. On the other hand, the channel of the associated broadcasting content may indicate part of a special series that is broadcasted weekly, say, as an event. It should be appreciated that such channels of a multi-channel broadcast may be arbitrarily defined by a terminal transmitting a PSIP broadcast signal, e.g., a digital broadcasting station. A multi-channel format can be established between channels (e.g., virtual channels) having different physical channels as well as between channels of the same physical channel. Herein, a "multi-channel" is a channel deemed to bear relevance to another channel.

The present invention provides for newly defining a virtual channel table (VCT), which may be a terrestrial or cable VCT, to map to each other channels having associated broadcasting content. Table 1 shows an exemplary terrestrial virtual channel table included in the PSIP information of a broadcast signal to define a multi-channel according to the present invention, though it should be appreciated that the information of Table 1 is applicable to a cable VCT as well as a terrestrial VCT.

TABLE 1

| Syntax | No. of Bits | Format |
| --- | --- | --- |
| terrestrial_virtual_channel_table_section ( ) { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=0; i < num_channels_in_section; i++) { | | |
|     short_name | 7 x 16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i = 0; i < N; i++) { | | |
|       descriptor ( ) | | |
|     } | | |
|   } | | |
|   reserved | 6 | '111111' |
|   additional_descriptors_length | 10 | uimsbf |
|   for (j=0; j < N; j++) { | | |
|     additional_descriptor ( ) | | |
|   } | | |
|   CRC_32 | 32 | rpchof |
| } | | |

Referring to Table 1, the present invention is characterized in newly defining at least one of four reserved fields as a relevant program field. The relevant program field serves as an identifier for mapping to each other channels having relevance in their broadcasting content, either directly or indirectly. That is, by parsing any of these fields, if a corresponding pattern is detected in the text contained in the field, it may be determined that the indicated channel bears relevance to another event or channel and that they therefore may be classified as associated events or channels.

For instance, if there is relevance between a broadcast program of a virtual channel A and a broadcast program of a virtual channel B, by setting corresponding values for each of their relevant program fields, the programming of both channels may be automatically output simultaneously to a screen including, for example, a main screen and a subscreen. Accordingly, in a broadcast receiver that receives the information of Table 1, the simultaneous display of more than one program can be achieved even without execution by a user of a specific action or command entry with respect to the broadcast receiver, since the receiver is able to interpret the presence or absence of inter-multi-channel relevance by parsing the relevant program field. In other words, the inclusion of the relevant program field in a terrestrial VCT, such as that of Table 1, enables a search of the table's channels to detect channels exhibiting relevance.

The present invention further provides for newly defining an event information table, or EIT, to map to each other events, channels, or the like having associated broadcasting content. Table 2 shows an exemplary event information table included in the PSIP information of a broadcast signal to define a multi-channel according to the present invention.

TABLE 2

| Syntax | No. of Bits | Format |
|---|---|---|
| event_information_table_section ( ) { | | |
|   table_id | 8 | 0xCB |
|   section_syntax_indicator | 1 | '1' |
|   private_indicator | 1 | '1' |
|   reserved | 2 | '11' |
|   section_length | 12 | uimsbf |
|   source_id | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   num_events_in_section | 8 | uimsbf |
|   for (j = 0; j < num_events_in_section; j++) { | | |
|     reserved | 2 | '11' |
|     event_id | 14 | uimsbf |
|     start_time | 32 | uimsbf |
|     reserved | 2 | '11' |
|     ETM_location | 2 | uimsbf |
|     length_in_seconds | 20 | uimsbf |
|     title_length | 8 | uimsbf |
|     title_text ( ) | var | |
|     reserved | 4 | '1111' |

TABLE 2-continued

| Syntax | No. of Bits | Format |
|---|---|---|
|     descriptors_length | 12 | |
|     for (i = 0; i < N; i++) { | | |
|       descriptor ( ) | | |
|     } | | |
|   } | | |
|   CRC_32 | 32 | rpchof |
| } | | |

Referring to Table 2, the present invention is characterized in newly defining at least one of three reserved fields as a relevant program field. In this case as well, the relevant program field serves as an identifier for mapping to each other channels having relevance in their broadcasting content, either directly or indirectly. That is, by parsing any of these fields, if a corresponding pattern is detected in the text contained in the field, it may be determined that the indicated event or channel bears relevance to another event or channel and that they therefore may be classified as associated events or channels. Here, an "event" may refer to a discrimination of broadcast programs within a broadcast set of PSIP information.

For instance, if there is relevance between two events (e.g., an event A and an event B), by setting corresponding values for each of their relevant program fields, the programming of both events may be automatically output simultaneously to a screen including, for example, a main screen and a subscreen. Accordingly, in a broadcast receiver that receives the information of Table 2, the simultaneous display of more than one event can be achieved even without execution by a user of a specific action or command entry with respect to the broadcast receiver. The receiver interprets, by parsing the relevant program field, the presence or absence of a relevance between multi-channels carrying events having the same relevant program field values. In other words, the inclusion of the relevant program field in an EIT, such as that of Table 2, enables a search of the table's channels to detect channels exhibiting relevance.

By thus defining the relevant program field in the EIT, inter-multi-channel relevance can be determined regardless of broadcast time, since every EIT contains the current time as well as scheduling information for the broadcast of an event. Therefore, the present invention enables an automatic joint management of a multi-channel broadcast even though there may be no concurrent broadcast of the multi-channels, since a relevance of multi-channels broadcasted at disparate times may be determined by respectively parsed according to the relevant program field.

Tables 3 and 4 illustrate an example of the descriptor of the relevant program field of the present invention, which further provides for newly defining such a descriptor. Here, Table 3 shows an exemplary descriptor included in the PSIP information of a broadcast signal to define a multi-channel according to the present invention, and Table 4 exemplifies the bit stream syntax of the descriptor of Table 3.

TABLE 3

| | | Descriptor | Terrestrial Broadcast | | | | | |
|---|---|---|---|---|---|---|---|---|
| Descriptor Name | | Tag | PMT | MGT | VCT | EIT | DCCT | DCCSCT |
| stuffing descriptor | | 0x80 | * | * | * | * | * | * |
| AC-3 audio descriptor | | 0x81 | M | | | M | | |
| caption service descriptor | | 0x86 | O | | | M | | |
| content advisory descriptor | | 0x87 | O | | | M | | |
| extended channel name descriptor | | 0xA0 | | | M | | | |
| service location descriptor | | 0xA1 | | | S | | | |

TABLE 3-continued

| Descriptor Name | Descriptor Tag | Terrestrial Broadcast | | | | | |
|---|---|---|---|---|---|---|---|
| | | PMT | MGT | VCT | EIT | DCCT | DCCSCT |
| time-shifted service descriptor | 0xA2 | | | M | | | |
| component name descriptor | 0xA3 | M | | | | | |
| DCC departing request descriptor | 0xA8 | | | | | M | |
| DCC arriving request descriptor | 0xA9 | | | | | M | |
| redistribution control descriptor | 0xAA | M | | | M | | |
| ATSC private information descriptor | 0xAD | * | * | * | * | * | * |
| content identifier descriptor | 0xB6 | O | | | M | | |
| genre descriptor | 0xAB | | | | M | | |
| relevant program descriptor | 0xC0 | | | | M | | |

TABLE 4

| Syntax | No. of Bits | Format |
|---|---|---|
| relevant_program_descriptor ( ) { | | |
|   descriptor_tag | 8 | 0xC0 |
|   descriptor_length | 8 | uimsbf |
|   reserved | 3 | '111' |
|   number_of_programs | 5 | uimsbf |
|   for (i = 0; i < number_of_programs; i++) { | | |
|     major_channel_number | 10 | uimsbf |
|     minor_channel_number | 10 | uimsbf |
|     event_id | 14 | uimsbf |
|   } | | |
| } | | |

Referring to Table 3, the present invention is characterized in newly adding to a conventional PSIP descriptor table a relevant program descriptor defined by including multi-channel relevance information. This descriptor may also be defined in another table or included in an EIT in addition to the PSIP descriptor table. The tag value of the relevant program descriptor may be set to 0xC0, which is an exemplary value only.

Referring to Table 4, the structure of the relevant program descriptor added to the EIT may be configured as follows:

The "descriptor_tag" field indicates that a corresponding descriptor is used, namely, as "relevant_program_descriptor," and may have a field value of 0xC0.

The "descriptor_length" field indicates a length or size of a corresponding descriptor.

The "number_of_programs" field indicates a number of programs having relevance and may be set to a value of 1 to 20.

The "major_channel_number" field indicates a major channel number corresponding to the channel of a program exhibiting relevance and may indicate a major channel number ranging from 1 to 999.

The "minor_channel_number" field indicates a minor channel number corresponding to the channel of a program exhibiting having relevance and may indicate a minor channel number ranging from 0 to 999.

The "event_id" field identifies a corresponding event of an EIT.

The relevant program descriptor of Tables 3 and 4 enables a search of all programs having relevance to a specific event, by searching a program event within a virtual channel only. The checking for the presence of a relevance by program unit is also enabled. By recording the major channel, the minor channel, and the event identifier together, the present invention further enables an interpretation of relevance between multi-channels within the same physical channels and between different physical channels.

The present invention further provides for newly defining an event information table and an extended text table, to map to each to other events or channels having associated broadcasting content. Table 5 shows another exemplary event information table included in the PSIP information of a broadcast signal to define a multi-channel according to the present invention, while Table 6 shows an exemplary extended text table included in the PSIP information of a broadcast signal to define a multi-channel according to the present invention.

TABLE 5

| Syntax | No. of Bits | Format |
|---|---|---|
| event_information_table_section ( ) { | | |
|   table_id | 8 | 0xCB |
|   section_syntax_indicator | 1 | '1' |
|   private_indicator | 1 | '1' |
|   reserved | 2 | '11' |
|   section_length | 12 | uimsbf |
|   source_id | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   num_events_in section | 8 | uimsbf |
|   for (j = 0; j < num_events_in_section; j++) { | | |
|     reserved | 2 | '11' |
|     event_id | 14 | uimsbf |
|     start_time | 32 | uimsbf |
|     reserved | 2 | '11' |
|     ETM_location | 2 | uimsbf |
|     length_in_seconds | 20 | uimsbf |
|     title_length | 8 | uimsbf |
|     title_text ( ) | var | |
|     reserved | 4 | '1111' |
|     descriptors_length | 12 | |
|     for (i = 0; i < N; i++) { | | |
|       descriptor ( ) | | |
|     } | | |
|   } | | |
|   CRC_32 | 32 | rpchof |
| } | | |

TABLE 6

| Syntax | No. of Bits | Format |
|---|---|---|
| extended_text_table_section ( ) { | | |
|   table_id | 8 | 0xCC |
|   section_syntax_indicator | 1 | '1' |
|   private_indicator | 1 | '1 |
|   reserved | 2 | '11' |
|   section_length | 12 | uimsbf |
|   ETT_table_id_extension | 16 | 0x0000 |

TABLE 6-continued

| Syntax | No. of Bits | Format |
|---|---|---|
| reserved | 2 | '11' |
| version_number | 5 | uimsbf |
| current_next_indicator | 1 | '1' |
| section_number | 8 | 0x00 |
| last_section_number | 8 | 0x00 |
| protocol_version | 8 | uimsbf |
| ETM_id | 32 | uimsbf |
| extended_text_message 0 | var | |
| CRC_32 | 32 | rpchof |
| } | | |

The title text field of Table 5 and the extended text message field of Table 6 are text-type fields. Each is a field in which a title of an event, or additional text-based information, can be inserted. Therefore, by parsing either of these fields, if a corresponding pattern is detected in the text contained in the field, it may be determined that the indicated event or channel bears relevance to another event or channel and that they therefore may be classified as associated events or channels.

For instance, a relevance between channel 11 1 and channel 11 2 may be determined based on their corresponding table information, namely, an EIT such as Table 5 and an ETT such as Table 6. If it is assumed that, for channel 11 1, the title text field of the EIT contains "World Cup Soccer Game (Korea vs. Togo)" and the extended text message field of the ETT contains "World Cup Soccer Preliminary Game of Korea vs. Togo: Ahn Jung-whan Special" and if it is assumed that, for channel 11 2, the text title field of the EIT contains "An Jung-whan Special" and the extended text message field of the ETT contains "Personal Play of An Jung-whan [associated program]: World Cup Preliminaries, Korea vs. Togo," correlative patterns may be detected in the table information to determine relevance. Here, a presence or absence of relevance per channel is determined by the appearance of the "[associated program]" data in the extended text message (ETM), but the presence or absence of relevance per channel may also be determined by including a leading or trailing pattern in the title text fields.

It should be appreciated that the information of Tables 1-6 may be applied independently to implement the present invention. Preferably, the present invention is implemented using any one or at least two of the tables.

Referring to FIG. 1, a broadcast receiver for processing a broadcast signal defining a multi-channel broadcast according to the present invention includes a tuner 101, a demodulator 102, a demultiplexer 103, an audio and video (A/V) decoder 104, a display 105, a PSI/PSIP decoder 106, a PSI/PSIP database 107, an application controller 108 provided with a channel manager 108a and channel mapper 108b, a flash memory 109, and an on-screen display (OSD) data generator 110. The broadcast receiver of the present invention may be included in a general digital television capable of digital broadcast reception, whereby the tuner 101 is capable of receiving a digital broadcast signal carrying PSIP information including PSI/PSIP tables such as an event information table, virtual channel table, or extended text table.

The demodulator 102 demodulates the tuned signal into, for example, a vestigial sideband (VSB) signal or enhanced VSB signal, and the demultiplexer 103 demultiplexes the demodulated signal into audio data, video data, and PSI/PSIP table data, with the audio and video data being output to the A/V decoder 104 and the PSI/PSIP table data being output to the PSI/PSIP decoder 106. The demultiplexing of the audio and video data may be controlled by the channel manager 108a, and the demultiplexing of the PSI/PSIP table data may be controlled by the PSI/PSIP decoder 106. The PSI/PSIP decoder 106 parses the PSI/PSIP table data and records the parsed data in the PSI/PSIP database 107.

With reference to the output of the channel mapper 108b, the channel manager 108a requests reception of a table bearing channel-associated information and then receives a corresponding result from the PSI/PSIP database 107 via the PSI/PSIP decoder 106, which performs a demuxing control operation with respect to the channel-associated information and outputs an A/V packet identifier list to the channel manager. In accordance with a received A/V packet identifier, the channel manager 108a indirectly controls the A/V decoder 104 by controlling the demultiplexer 103. The channel manager 108a also controls the tuner 101, which in turn enables the received digital broadcast signal to be recorded via the channel manager.

In the operation of the above broadcast receiver, the PSI/PSIP tables (EIT, VCT, ETT, etc.) are demultiplexed and provided to the PSI/PSIP decoder 106, which determines based on the PSI/PSIP table data whether a multi-channel exists. Here, a multi-channel may be considered to be any channel having associated broadcasting content, that is, broadcasting content associated with that of a specific channel or the primarily tuned channel. If the existence of such an associated broadcasting content channel (or "multi-channel") is detected, the application controller 108 controls the display 105 to simultaneously output the broadcast signals of a currently tuned broadcast channel and the detected multi-channel. The broadcast signal of the currently tuned broadcast channel may be output as a main picture, and the broadcast signal of the multi-channel may be output as the picture of a subscreen.

Figure 4:
FIG. 4 is an exemplary diagram of a screen displaying a multi-channel broadcast according to the present invention.

For example, as depicted in FIG. 4, the main picture may be displayed via a main screen 401, and the subscreen picture may be displayed via a subscreen 402. In the example of FIG. 4, one subscreen is displayed using a picture-in-picture (PIP) function. It should be appreciated, however, that the display 105 of the present invention may similarly use one or more of a PIP function, a picture-on-picture (POP) function, and a picture-and-picture (PAP) function, to display broadcast programs together on a screen. It should be further appreciated that, using multiple subscreens, the broadcast signal of more than one multi-channel may likewise be displayed together with the main picture broadcast signal.

Meanwhile, in response to a command signal for recording a broadcast signal of a specific channel, the application controller 108 may also record the broadcast signal of a multi-channel. Thus, the broadcast signal(s) of one or more multi-channels can be stored together with that of the specific channel. The recording command signal may be applied via a user interface (not shown), and the broadcast signals may be stored in a hard disc drive or other storage device (not shown). The broadcast programs of the specific channel and the multi-channel are preferably stored together in the same (i.e., one) folder but, if provided with correlative indexes, may be stored separately. While simultaneously outputting both of the recorded broadcast program of the specific channel and the broadcast program of the multi-channel, the application controller 108 may edit out portions of the broadcast programs to generate a new, seamless data stream, which can be similarly stored. In addition, the application controller 108 controls a graphical user interface for displaying a status of the broadcast receiver system via the OSD data generator 110, including a relevant channel list.

Figure 2:
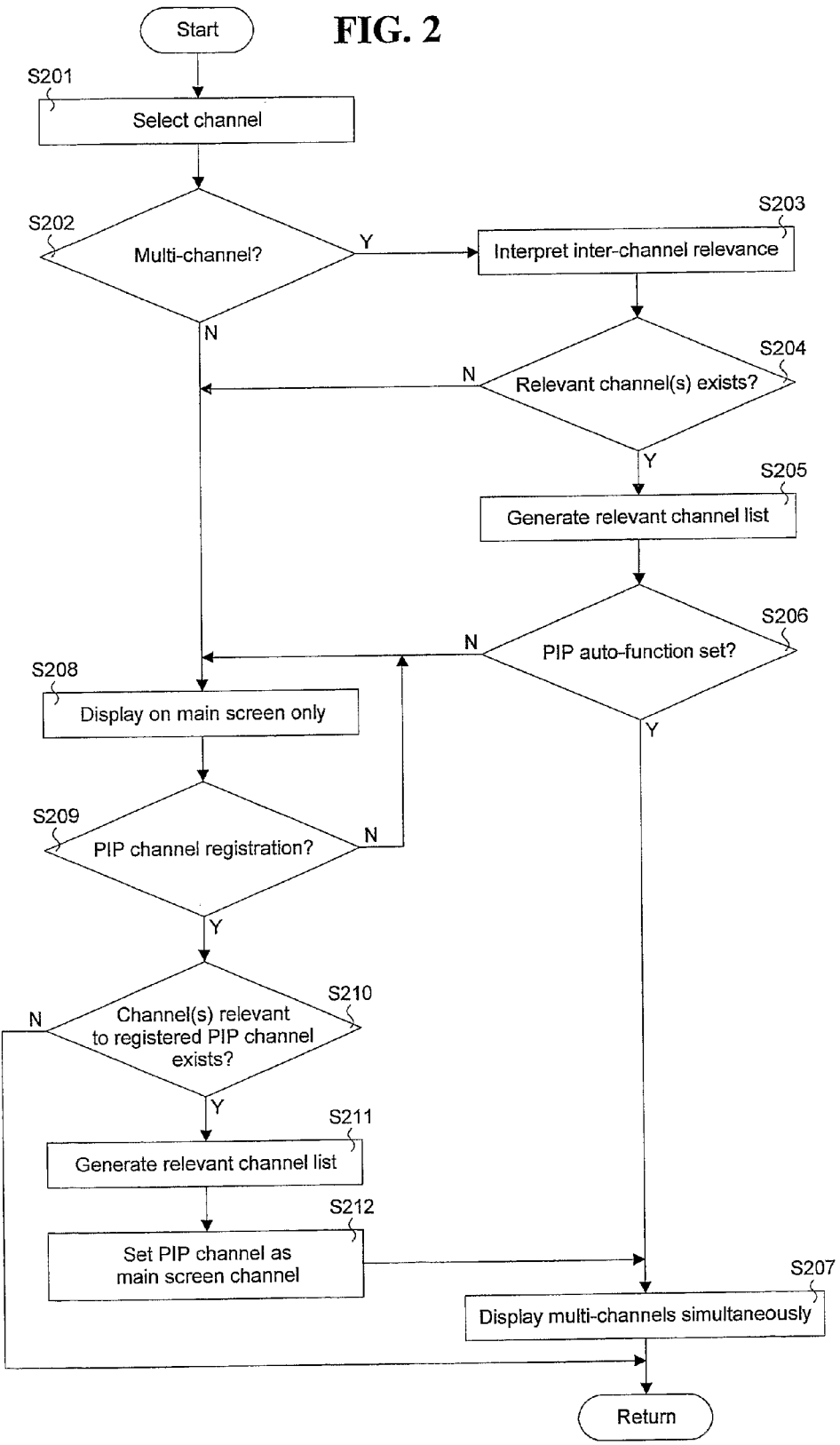
FIG. 2 is a flowchart of a method of controlling a receiver for processing a broadcast signal defining a multi-channel broadcast according to the present invention, in which the broadcast programs of a specific channel and at least one relevant multi-channel are output simultaneously.

FIG. 2 illustrates a method according to the present invention, whereby a receiver for processing a broadcast signal defining a multi-channel broadcast is controlled to output simultaneously the broadcast programs of a specific channel and at least one relevant multi-channel. As shown in FIG. 2, a channel is selected by a user or is otherwise tuned to a specific channel (S201). It is then determined whether the tuned channel (specific channel) corresponds to a multi-channel (S202), and if so, inter-channel relevance is interpreted using the PSI/PSIP tables in the received broadcast signal to determine whether a relevant multi-channel exists (S203, S204). The operations of the steps S202 and S204 may be executed by a single operation or process step.

If it is determined that at least one relevant multi-channel exists, a list of such channels is generated (S205).

It is then determined whether a PIP auto-function is set, whereby a broadcast signal of a searched multi-channel is automatically output, i.e., displayed, on a subscreen whenever a relevant multi-channel is detected (S206). That is, the broadcast program of the specific (tuned) channel is output to a main screen and, simultaneously, the broadcast program of the multi-channel is output to a subscreen (S207). Here, the step S206 an optional step that may be skipped, in which case the step S207 would directly follow the step S205.

On the other hand, if it is determined in the step S202 that the specific channel does not correspond to a multi-channel, the broadcast program of the specific channel is output to the main screen only (S208). Subsequently, that is, while the specific channel broadcast program is being displayed (viewed), it is determined whether the user manually and separately registers a PIP channel (S209), and if so, it is determined whether at least one multi-channel relevant to the registered PIP channel exists (S210).

If it is determined that at least one such relevant channel exists, a corresponding list is generated (S211). Thereafter, assuming that the PIP channel is selected as a main screen channel (S212), the step S207 is executed. It should be appreciated that, in each of the steps S206, S209, S210, and S212, the PIP channel may refer to the channel of any subscreen, for example, using a PIP/POP/PAP function.

Figure 3:
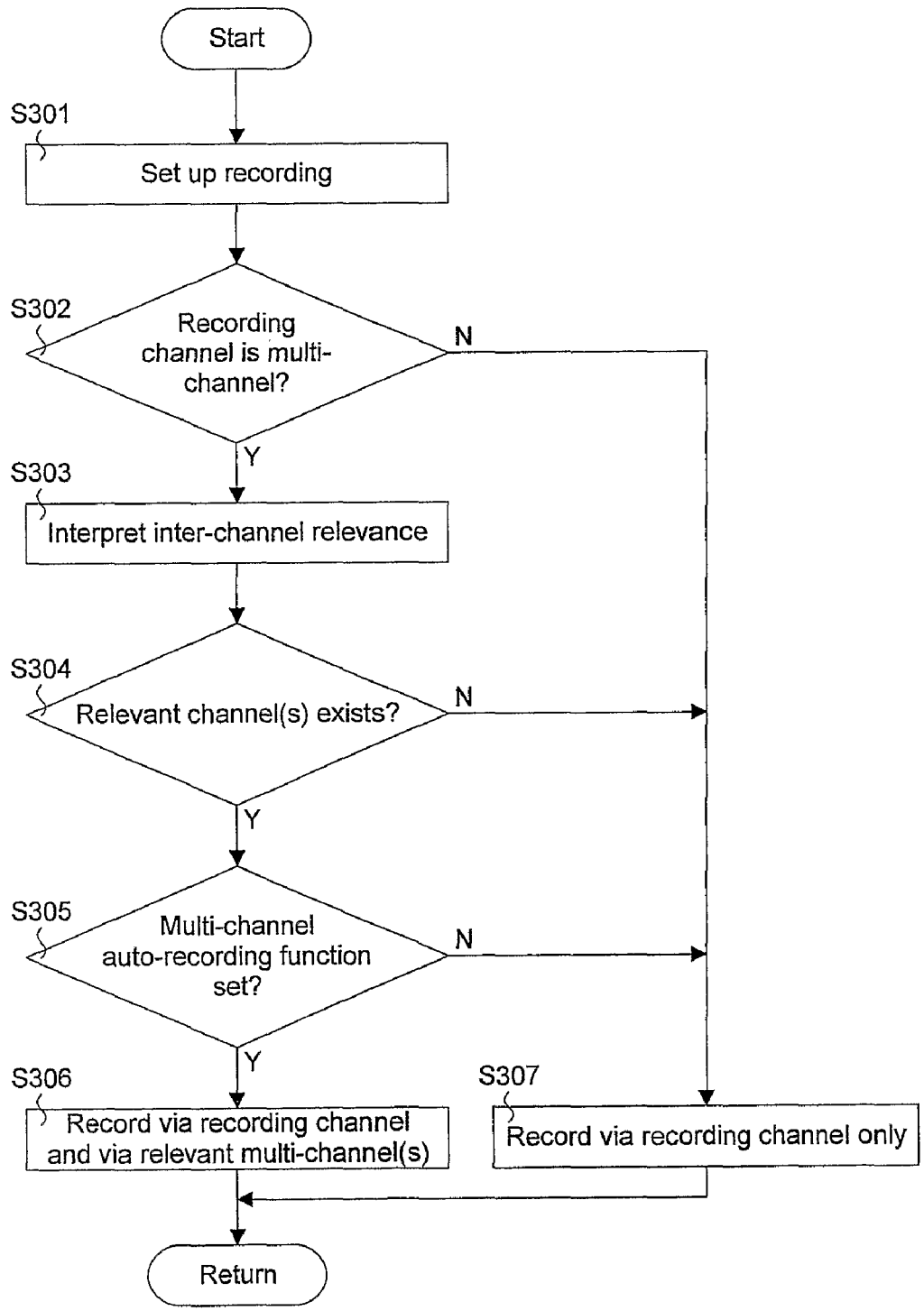
FIG. 3 is a flowchart of a method of controlling a receiver for processing a broadcast signal defining a multi-channel broadcast according to the present invention, in which the broadcast programs of a specific channel and at least one relevant multi-channel are recorded simultaneously.

FIG. 3 illustrates a method according to the present invention, whereby a receiver for processing a broadcast signal defining a multi-channel broadcast is controlled to record simultaneously the broadcast programs of a specific channel and at least one relevant multi-channel. As shown in FIG. 3, a specific channel is set for a recording operation, usually by a user (S301). It is then determined whether the recording channel corresponds to a multi-channel (S202), and if so, inter-channel relevance is interpreted using the PSI/PSIP tables in the received broadcast signal to determine whether a relevant multi-channel exists (S303, S304). The operations of the steps S302 and S304 may be executed by a single operation or process step.

If it is determined that at least one relevant multi-channel exists, it is then determined whether a multi-channel auto-recording function is set, whereby a broadcast signal of a searched multi-channel is automatically recorded whenever a relevant multi-channel is detected (S305). That is, the broadcast programs of the recording channel and the at least one the relevant multi-channel are simultaneously recorded (S306). Here, the step S305 an optional step that may be skipped, in which case the step S306 would directly follow the step S304.

On the other hand, if it is determined in the step S302 that the recording channel does not correspond to a multi-channel, the recording operation is performed only for the broadcast program of the recording channel (S307). Here, the recording operation utilizes a storage device such as a hard disc drive that may be provided to a digital broadcast receiver adopting the present invention.

In an exemplary operation of the above-described method of the present invention, it may be assumed that channel 6-1 and channel 6-2 are each determined to be relevant multi-channels, that is, channels having associated broadcasting content. Here, either channel may be considered the specific channel or a selected recording channel. For example, by selecting channel 6-1, the associated broadcasting content channel 6-2 is automatically displayed in a subscreen format. Thus, broadcast programs of associated channels can be simultaneously processed, that is, viewed, recorded, or edited.

Furthermore, assuming that each of channels 6-3 and 6-4 is also determined to be a relevant multi-channel, that is, a channel associated with channel 6-1 serving as the current main channel, priorities may be respectively assigned to channels 6-3 and 6-4 in the event that only one subscreen is in use, to enable a channel changing operation for the single subscreen. By employing multiple tuners and MPEG decoders, a corresponding output for each of channels 6-1, 6-2, 6-3, and 6-4 can be enabled using multiple subscreens.

After a termination of a subscreen, even if the main screen channel (e.g., channel 6-1) is selected, a further subscreen registration by a user may be required. If, however, the user performs a subscreen registration after selecting the main screen channel, the broadcast receiver enables the selection of a channel to be registered as a subscreen, by searching for the presence of a relevant channel (i.e., some channel relevant to channel 6-1) and then displaying a relevant channel list, or in this case, a list of channels 6-2, 6-3, and 6-4.

Meanwhile, in recording a broadcast program of a specific channel, the broadcast program of a multi-channel of relevance is recorded together with that of the specific channel. At the time of playback, the relevant multi-channel is searched using a recording database, and the resultant broadcast programs are simultaneously displayed, that is, together on one screen including for example a main screen and one or more subscreens. In addition to such recording, the joint processing (management) of multi-channels according to the present invention includes editing, whereby multi-channel recording content may be material respectively recorded into one continuous and complete recording.

Figure 5:
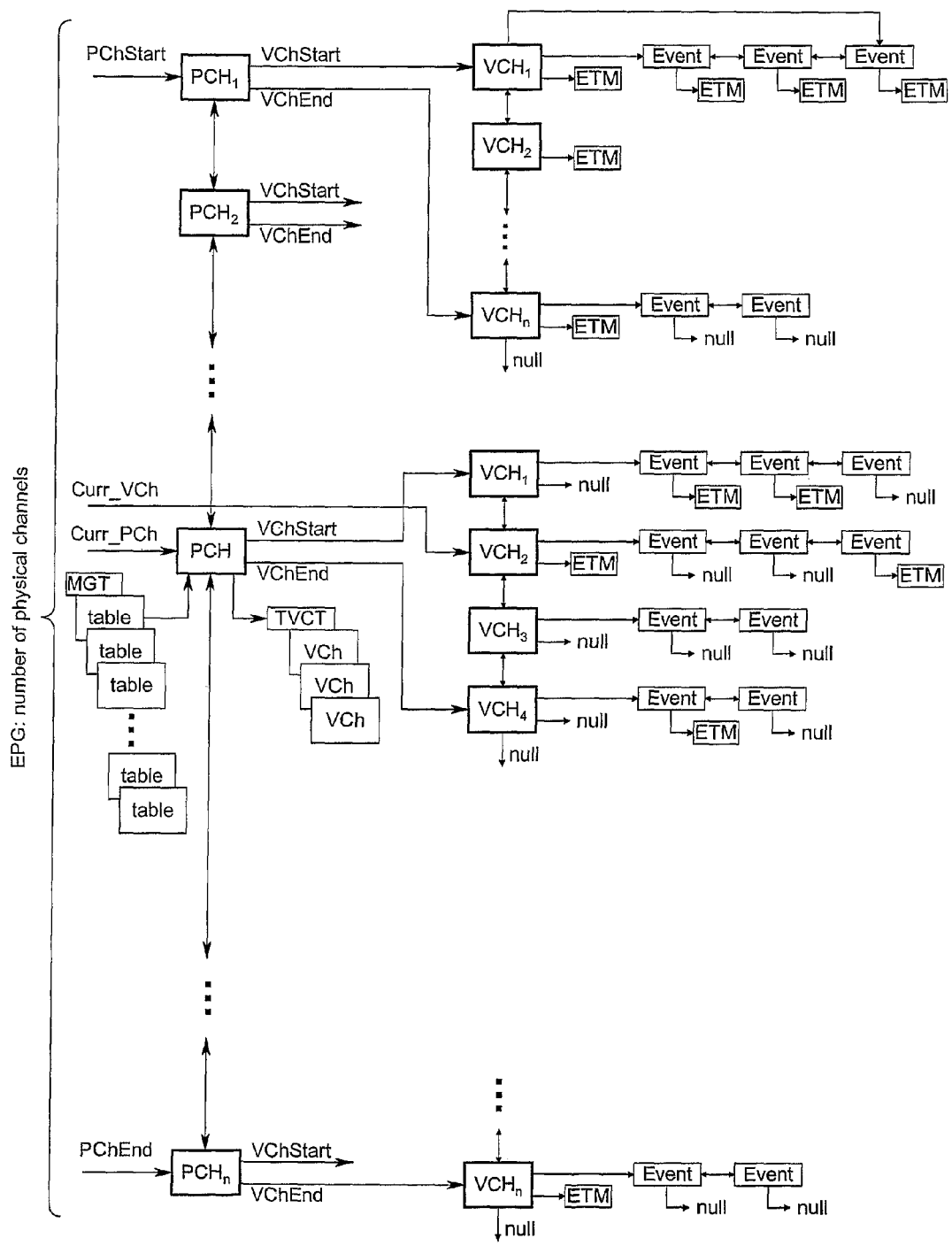
FIG. 5 is a block diagram of a database of a PSIP engine according to the present invention.

FIG. 5 illustrates a database of a PSIP engine according to the present invention. Here, PSIP information added to the inter-multi-channel relevance interpretation is schematically illustrated, from an electronic program guide (EPG) through any number of events. The EPG indicates a range of physical channels (NumOfPCh), including for example a set of physical channels $PCH_1$ to $PCH_n$, and any physical channel may be assigned a set of virtual channels $VCH_1$ to $VCH_n$. Accordingly, although a user performs no special action, the broadcast program of an associated broadcasting content channel, i.e., multi-channel, is output simultaneously with a broadcast program of a specific channel, using a subscreen such as a PIP screen corresponding to a main screen of a broadcast receiver.

Industrial Applicability

By adopting the present invention, a broadcast receiver manages channels relevant to each other by receiving a broadcast signal defining a multi-channel broadcast. Accordingly, in managing multi-channels including at least one associated broadcasting content channel, a broadcast program of a specific channel and a broadcast program of a multi-channel relevant to the specific channel may be simultaneously output (displayed) and may be simultaneously recorded. Therefore, instead of searching relevant multi-channels one by one, for example, to enable multi-channel viewing or to set up multi-channel recording, the user is able to process (view, record, etc.) broadcast programs having directly or indirectly associated broadcasting content, through a user selection or designation of the specific channel only.

Through the interpretation of the associated broadcasting content between multi-channel programs (multi-channels within the same physical channel or multi-channels between different physical channels), the broadcast programs can be jointly managed, as if packaged together. For instance, if a program of a relevant multi-channel exists, i.e., is being broadcast or is scheduled to be broadcast, a broadcast information banner displays an indication of such existence (relevant program presence or absence) together with a corresponding list of relevant events, which may be displayed using a recording list screen or as part of an EPG information display. Further, in case of a multi-display operation using PIP/POP/PAP function, a relevant program can be displayed based on priority, the relevant program can be recorded as a package, and the recorded program can be output accordingly, i.e., using a multi-display format; and in recording a relevant program as a package, multiple recorded programs can be edited into a single program. Hence, the present invention enables a user to simultaneously view/record/edit broadcast programs having associated broadcasting content without taking any special action and thereby provides enhanced user convenience.

While the present invention has been described and illustrated herein with reference to one or more preferred embodiments, it will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A method of controlling a receiver, the method comprising:
   receiving a broadcast signal defining a multi-channel broadcast, having additional information, the additional information including associated channel information indicating a channel of associated broadcasting content, the associated channel information enabling the receiver to recognize channels having associated broadcasting content;
   detecting, based on the associated channel information, at least one channel having the associated broadcasting content according to a selection of a specific channel, wherein the associated broadcasting content has at least one broadcast program associated with the selected specific channel; and
   processing in tandem a broadcast program of the selected specific channel and the at least one broadcast program of the detected at least one channel,
   wherein the processing comprises storing, in a storage device, the broadcast program of the selected specific channel and the at least one broadcast program of the detected at least one channel,
   wherein each broadcast program of the detected at least one channel having associated broadcasting content is stored in the storage device in association with the broadcast program of the selected specific channel, and
   wherein the associated channel information of the additional information included in the broadcast signal has a relevant program field.

2. The method of claim 1, wherein the additional information further comprises program and system information protocol (PSIP) information.

3. The method of claim 1, wherein the additional information further comprises service information for digital video broadcasting (DVB-SI).

4. The method of claim 1, wherein the broadcast program of the selected specific channel is a currently broadcasted program and wherein each broadcast program of the detected at least one channel having associated broadcasting content is a currently broadcasted program.

5. The method of claim 1, wherein the broadcast program of the selected specific channel is a currently broadcasted program and wherein each broadcast program of the detected at least one channel having associated broadcasting content is a scheduled program.

6. The method of claim 1, wherein the associated channel information is defined by the relevant program field in a terrestrial virtual channel table (TVCT) of the additional information.

7. The method of claim 1, wherein the associated channel information is defined by the relevant program field in a cable virtual channel table (CVCT) of the additional information.

8. The method of claim 1, wherein the associated channel information is defined by the relevant program field, the relevant program descriptor, or a title text field (title text) in an event information table (EIT) of the additional information.

9. The method of claim 1, wherein the associated channel information is defined by an extended text message field (extended_text_message) in an extended text table (ETT) of the additional information.

10. The method of claim 1, wherein associated channel information of the selected specific channel is defined by a broadcasting station transmitting the broadcasting signal to the receiver.

11. The method of claim 1, further comprising:
    displaying, using an on-screen display (OSD) function, a list of stored broadcast programs of the detected at least one channel in response to a user selection of the selected specific channel for playback.

12. The method of claim 1, further comprising:
    displaying the stored broadcast programs of the selected specific channel and the detected at least one channel in response to a user selection of the selected specific channel for playback.

13. The method of claim 1, further comprising:
    editing at least one of the stored broadcast programs of the selected specific channel and the detected at least one channel in response to a user command for determining a playback sequence.

14. The method of claim 1, wherein the processing further comprises simultaneously displaying, on a screen of the receiver, the broadcast program of the selected specific channel and the at least one broadcast program of the detected at least one channel.

15. The method of claim 14, wherein the simultaneous display includes at least one of a picture-in-picture (PIP) function, a picture-on-picture (POP) function, and a picture-and-picture (PAP) function, to display the broadcast program of the selected specific channel and the at least one broadcast program of the detected at least one channel together on the screen of the receiver.

16. The method of claim 14, further comprising generating a list associated with the detected at least one channel, and then displaying the generated list on a portion of the screen of the receiver.

17. A receiver, comprising:
    a tuner for receiving a broadcast signal defining a multi-channel broadcast, having additional information, the additional information including associated channel information indicating a channel of associated broadcasting content, the associated channel information enabling the receiver to recognize channels having associated broadcasting content;

a detector for detecting, based on the associated channel information, at least one channel having the associated broadcasting content according to a selection of a specific channel, wherein the associated broadcasting content channel has at least one broadcast program associated with the selected specific channel; and a storage device for storing a broadcast program of the selected specific channel and the at least one broadcast program of the detected at least one channel, wherein each broadcast program of the detected at least one channel is stored in the storage device in association with the broadcast program of the selected specific channel, and wherein the associated channel information of the additional information included in the broadcast signal has a relevant program field.

18. The receiver of claim 17, further comprising:
a controller for generating a command signal for selecting the specific channel according to a user selection.

19. The receiver of claim 18, further comprising:
an on-screen display (OSD) data generator for generating OSD data for displaying a list of the detected at least one channel on at least part of a screen of the receiver under the control of said controller.

20. The receiver of claim 17, further comprising:
an editor for editing at least one of the stored broadcast programs of the selected specific channel and the detected at least one channel in response to a user command for determining a playback sequence.

21. The receiver of claim 17, further comprising:
a display for displaying the broadcast program of the selected channel and the broadcast program of the detected at least one channel, wherein the display uses at least one of a picture-in-picture (PIP) function, a picture-on-picture (POP) function, and a picture-and-picture (PAP) function, to display the broadcast programs together on a screen of said display.

* * * * *